(12) United States Patent
Matsuoka et al.

(10) Patent No.: US 6,341,928 B1
(45) Date of Patent: Jan. 29, 2002

(54) PALLET CHANGER APPARATUS

(75) Inventors: Nobuyuki Matsuoka, Ichinomiya; Masahiko Inukai, Nagoya, both of (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/540,875

(22) Filed: Mar. 31, 2000

(30) Foreign Application Priority Data

Sep. 30, 1999 (JP) .......................................... 11-279541

(51) Int. Cl.$^7$ ................................................. B23Q 7/02
(52) U.S. Cl. ............................. 414/226.05; 198/346.1; 198/465.1; 483/14; 409/134
(58) Field of Search ........................... 198/346.1, 465.1; 414/222.07, 226.05; 483/14; 409/134

(56) References Cited

U.S. PATENT DOCUMENTS

| | | | |
|---|---|---|---|
| 4,797,052 A | * 1/1989 | Ohta et al. ................ | 414/744.3 |
| 5,265,497 A | * 11/1993 | Curless ..................... | 198/346.1 |
| 5,531,004 A | * 7/1996 | Ahn ........................... | 409/134 |
| 5,971,679 A | * 10/1999 | Kim ........................... | 409/134 |

FOREIGN PATENT DOCUMENTS

JP      A-7-41503      5/1995

* cited by examiner

*Primary Examiner*—Christopher P. Ellis
*Assistant Examiner*—Mark A. Deuble
(74) *Attorney, Agent, or Firm*—Oliff & Berridge, PLC (57) ABSTRACT

In a pallet changer apparatus, a pallet changing arm is connected to a motor via a raising/lowering mechanism and an intermittent drive unit. During operation of the motor, the pallet changing arm is raised from a lowermost position to an uppermost position, and is held at the uppermost position, and then is lowered from the uppermost position to the lowermost position. The pallet changing arm is also connected to the motor via a turning mechanism and a second cam drive portion. During operation of the motor, the pallet changing arm is turned while being held at the uppermost position. The pallet changing arm is moved up and down and turned by using the single motor provided above a table. The table below the pallet changing arm is reduced in size so as to allow an operator to perform operations without being impeded by the table. The structure also eliminates the need to determine the drive time of a plurality of drive force sources based on output signals of sensors, thereby decreasing the possibility of a malfunction and improving reliability.

22 Claims, 9 Drawing Sheets

PALLET CHANGER APPARATUS

BACKGROUND OF THE INVENTION

1. Field of the Invention

The present invention relates to a pallet changer apparatus for exchanging pallets between a setup position on a table, at which setup for the processing of a workpiece is performed, and a processing position on the table at which the workpiece is processed.

2. Description of the Related Art

A machining center described in, for example, Japanese Examined Patent Publication No. HEI 7-41503, has a structure in which pallets are interchanged between a setup position and a processing position by operating a pallet changing arm in a turning manner. In this structure, the pallets are removed from each of the two positions by raising the pallet changing arm before turning it, and the pallets are placed at each of the two positions by lowering the pallet changing arm after turning it.

In the above-described structure, the pallet changing arm is raised, lowered and turned by a motor and a cylinder disposed below the table. Therefore, the entire size of the table is large so that the table impedes an operator from performing operations smoothly. Also, because the motor is disposed below the table, it is difficult to access to perform maintenance on the motor. Furthermore, since the drive times of the cylinder and the motor needs to be determined based on output signals of sensors, there exists a rather high possibility of a malfunction, thereby resulting in decreased reliability.

SUMMARY OF THE INVENTION

Accordingly, it is an object of the present invention to provide a pallet changer apparatus that achieves high reliability and allows an operator to easily perform required operations.

In accordance with the invention, a pallet changer apparatus for changing pallets between a setup position on a table, at which a setup for a processing is performed, and a processing position on the table, at which a workpiece is processed, includes a pallet changing arm that holds the pallets, a turning mechanism that turns the pallet changing arm between the setup position and the processing position, a raising/lowering mechanism that removes the pallets from the setup position and the processing position by raising the pallet changing arm, and that places the pallets at the setup position and the processing position by lowering the pallet changing arm after turning the pallet changing arm, and a drive force source that generates a drive force for the raising/lowering mechanism and the turning mechanism. The drive force source is provided above the table.

In the above-described pallet changer apparatus, the pallet changing arm is moved up and down and turned by using the single drive force source provided above the table. Due to this structure, the table can be reduced in size so as to allow an operator to perform operations without being impeded by the table. The structure also eliminates the need to determine the drive times of a plurality of drive sources based on output signals of sensors, thereby decreasing the possibility of a malfunction and improving reliability. Also, because the motor is disposed above the table, it is convenient to access to perform maintenance on the motor.

The pallet changer apparatus may further include a first cam drive portion that transmits the drive force from the drive force source to the turning mechanism at a set timing, and a second cam drive portion that transmits the drive force from the drive force source to the raising/lowering mechanism at a set timing.

Since the drive time of the turning mechanism and the drive time of the raising/lowering mechanism are set by the first cam drive portion and the second can drive portion, the pallet changing arm is turned and raised and lowered reliably at the set timings without malfunctioning. Therefore, the reliability of the apparatus further improves.

The pallet changer apparatus may further include a partition cover provided between the setup position and the processing position. The partition cover is connected to the turning mechanism and the raising/lowering mechanism.

The provision of the partition cover prevents an undesired event such as, for example, during the processing of a workpiece, processing debris traveling from the processing position to the setup position. Furthermore, since it is unnecessary to provide dedicated drive force sources to turn and raise and lower the partition cover, the apparatus structure can be simplified.

BRIEF DESCRIPTION OF THE DRAWINGS

A preferred embodiment of the present invention will be described in detail with reference to the following figures wherein:

FIG. 5(*a*) is a chart indicating the behavior of a lever;

FIG. 5(*b*) is a chart indicating the behavior of the pallet changing arm and turning covers;

FIG. 6(*a*) is a side view of the protection cover apparatus;

FIG. 6(*b*) is an enlarged side view of portions of the apparatus shown in FIG. 6(*a*);

FIG. 7(*a*) is a top plan view showing the protection cover apparatus and the pallet changer apparatus;

FIG. 7(*b*) is an enlarged top plan view of portions of the apparatus shown in FIG. 7(*a*);

FIG. 8(*a*) is a side view showing the pallet changer apparatus, with the pallet changing arm being at the lowered position;

FIG. 8(*b*) is a side view showing the pallet changer apparatus, with the pallet changing arm raised.

DETAILED DESCRIPTION OF PREFERRED EMBODIMENT

Figure 9:
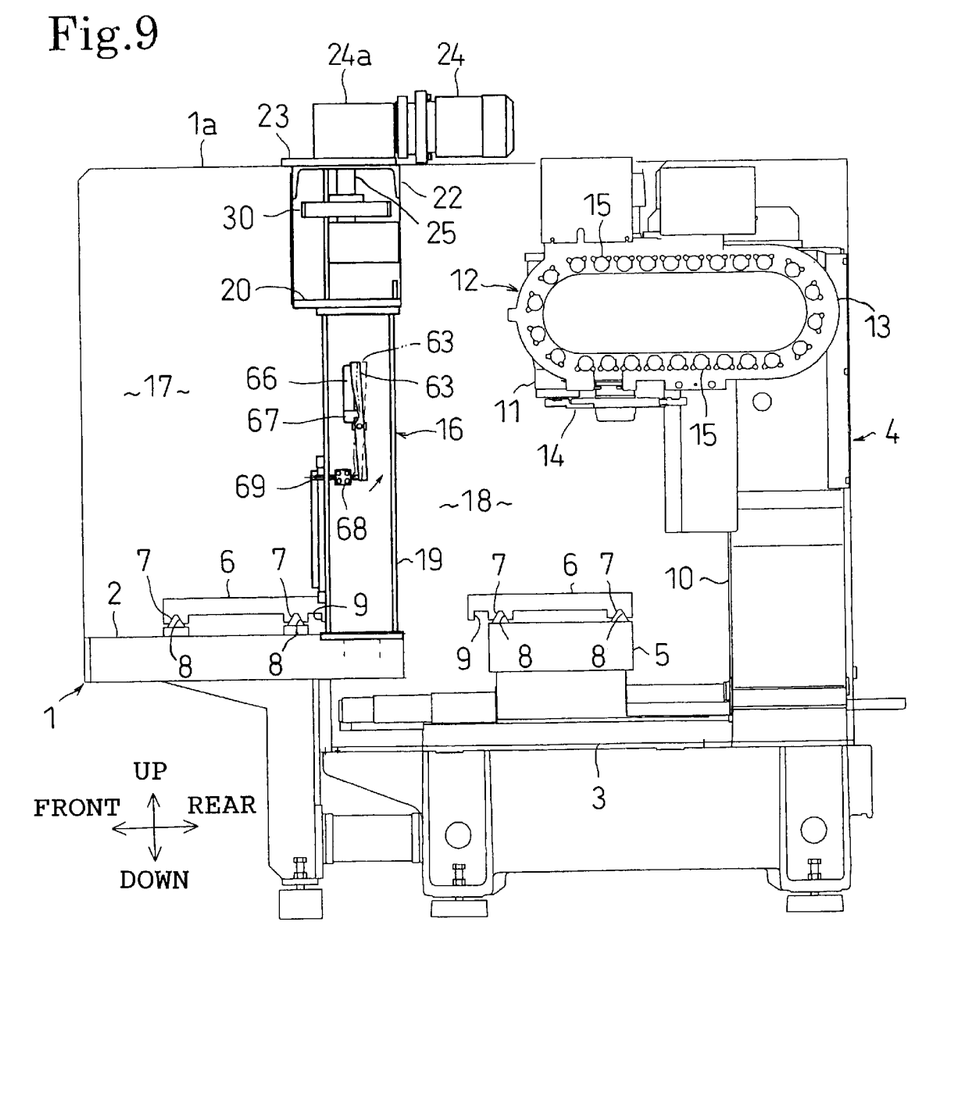
FIG. 9 is a side view showing an overall structure of the apparatus.

A preferred embodiment of the present invention will be described in detail hereinafter with reference to the accompanying drawings. Referring to FIG. 9, a table 1, placed on a surface, such as a floor in a factory, is covered with a splash cover 1*a*. The table 1 has a higher table portion 2 and a lower table portion 3 that are provided forward and rearward, respectively, in the table 1. A machining center 4 is mounted on the rearward lower table portion 3. The machining center 4, that is, a machine tool, is constructed as described below.

MACHINING CENTER 4

A work table 5 is mounted on an upper surface of the lower table portion 3 in such a manner that the work table 5 is movable rightward, leftward, forward, and rearward. A pallet 6 is placed on an upper surface of the work table 5. A workpiece (not shown) is placed on an upper surface of the pallet 6. The work table 5 has a plurality of triangular-shaped positioning protrusions 7. The pallet 6 has a plurality of triangular-shaped positioning recesses 8 and a plurality of rectangular-shaped positioning recesses 9 (only one of them is shown in FIG. 9). The pallet 6 is positioned at a processing position at which the workpiece on the pallet 6 is processed, by the positioning recesses 8 of the pallet 6 engaging with the protrusions 7 of the work table 5. During processing of the workpiece, the work table 5 and the pallet 6 are firmly secured by a pallet clamp device (not shown).

A column 10 is fixed to the upper surface of the lower table portion 3. A main shaft head 11 is attached to the column 10 so as to be movable up and down. A main shaft (not shown) extending in a vertical direction is rotatably connected to the main shaft head 11. A tool is detachably attached to a lower end portion of the main shaft. The main shaft is rotated and controlled based on an NC program. The tool attached to the main shaft is rotated together with the main shaft so as to process the workpiece on the pallet 6.

The work table 5 is moved rightward, leftward, forward or rearward by an amount of movement instructed by the NC program. At a set position that is defined by moving the work table 5, the tool of the main shaft processes the workpiece on the pallet 6. The main shaft head 11 is moved upward or downward by an amount instructed by the NC program. At a set depth that is defined by moving the main shaft head 11, the tool of the main shaft processes the workpiece on the pallet 6.

The machining center 4 has an automatic tool changer 12. The automatic tool changer 12 has a tool magazine 13 that is connected to a side face of the main shaft head 11, and a tool changing arm 14 that is rotatably connected to the main shaft head 11. The tool magazine 13 accommodates a plurality of tools 15. The tool changing arm 14 automatically extracts a predetermined tool 15 designated by the NC program from the tool magazine 13, and automatically replaces a tool attached to the main shaft with the predetermined tool. The machining center 4 is constructed in this manner.

A protection cover apparatus 16 is mounted on the higher table portion 2 of the table 1. The protection cover apparatus 16 separates a setup space 17 over the higher table portion 2 from a processing space 18 over the lower table portion 3. The protection cover apparatus 16 is constructed as described below. PROTECTION COVER APPARATUS 16

Figure 1:
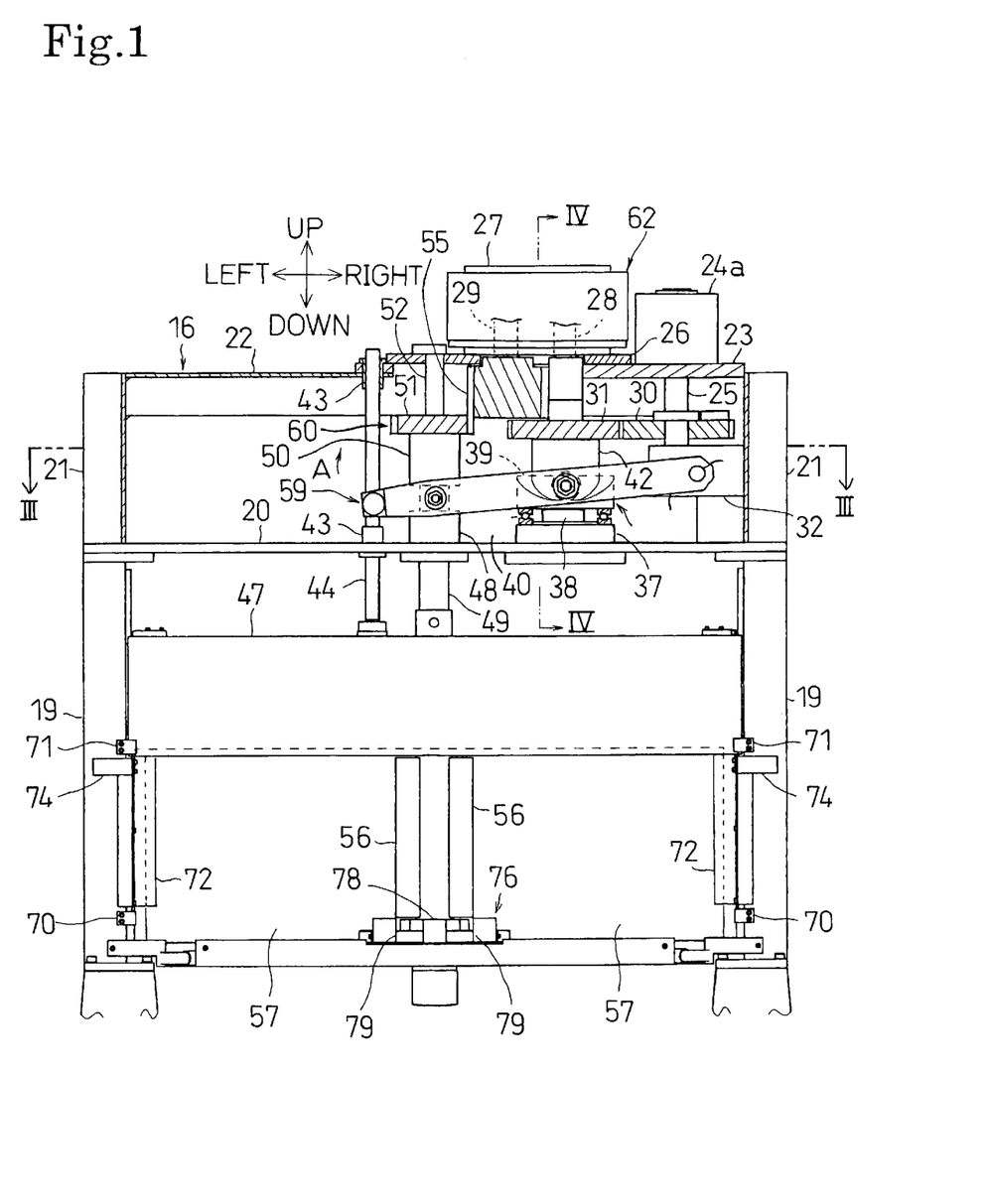
FIG. 1 is a front view of an embodiment of the invention that shows a protection cover apparatus and a pallet changer apparatus, with a pallet changing arm and the like being at a lowered position.
Figure 7:
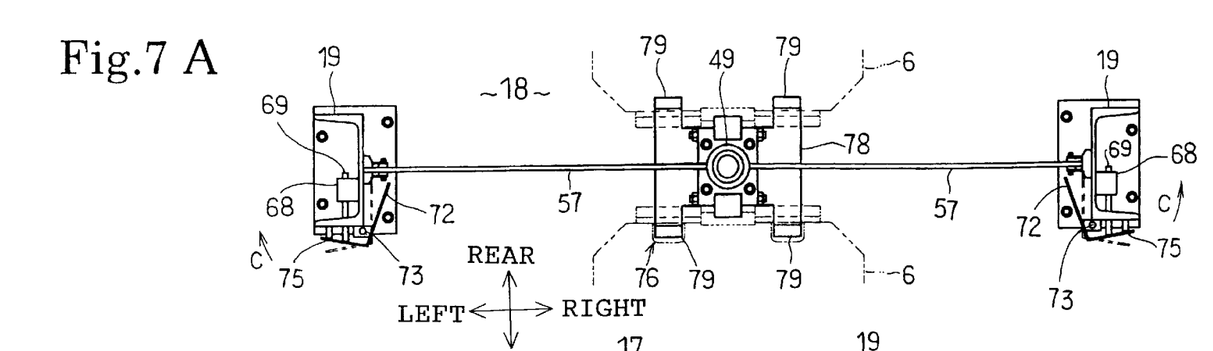

Referring to FIG. 7(a), laid-down square U-shaped support columns 19 are fixed to right and left side portions of the higher table portion 2. An intermediate plate 20 is fixed to upper end portions of the support columns 19 as shown in FIG. 1. Support columns 21 are fixed to right and left side portions of the intermediate plate 20. A top plate 22 is fixed to upper end portions of the support columns 21.

Figure 6:
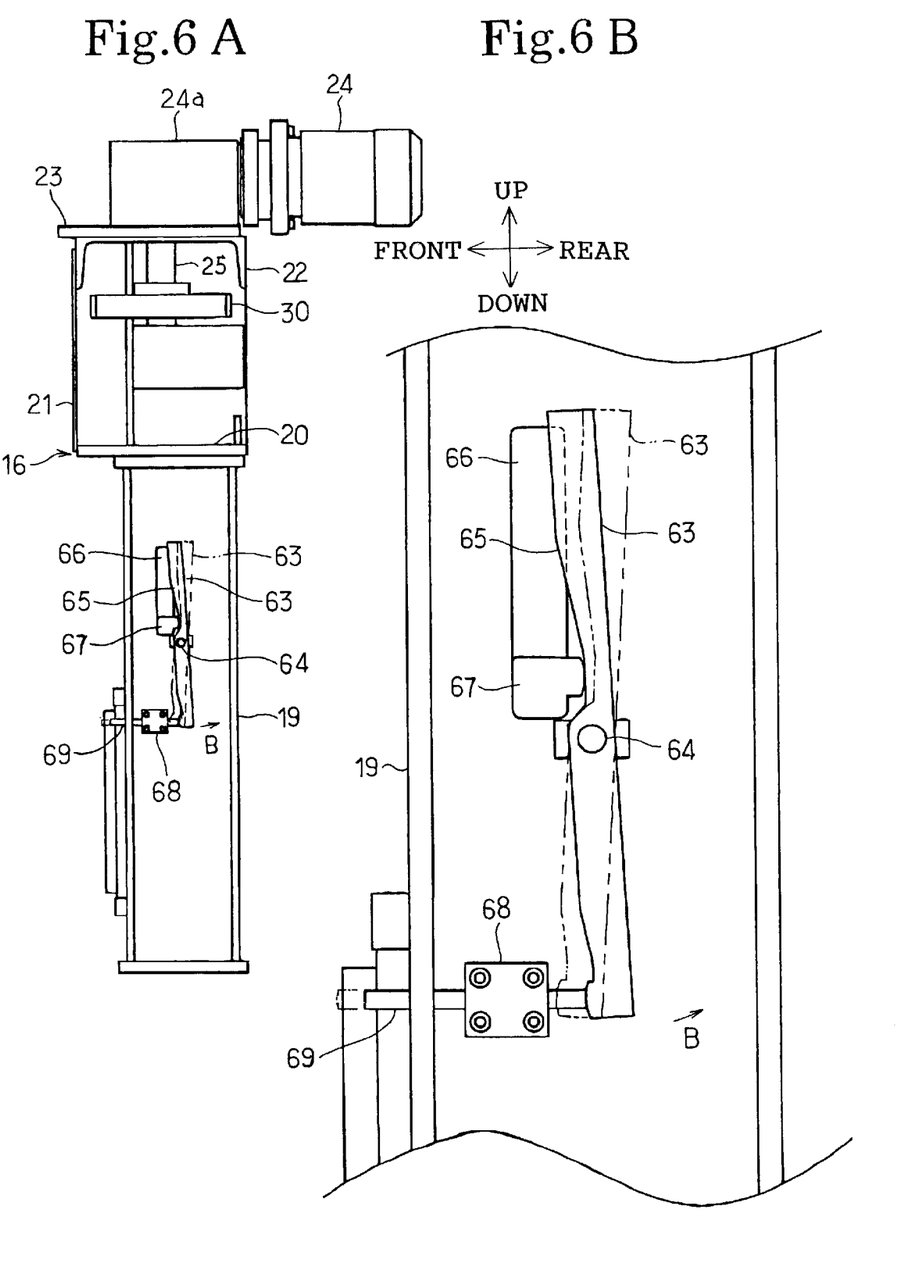

A mounting plate 23 is fixed to a right side portion of an upper surface of the top plate 22. As shown in FIG. 6(a), a speed reducing mechanism 24a of a motor 24 is fixed to the mounting plate 23. The motor 24 corresponds to a drive force source. A rotation shaft 25 of the motor 24 extends through the mounting plate 23 and protrudes downward therefrom as shown in FIG. 1. A mounting plate 26 is fixed to a left side portion of an upper surface of the mounting plate 23. An intermittent drive unit 27, corresponding to a first cam drive portion, is fixed to the mounting plate 26. The intermittent drive unit 27 has an input shaft 28 and an output shaft 29 that are rotatable. The input shaft 28 and the output shaft 29 of the intermittent drive unit 27 extend through the mounting plate 26 and protrude downward therefrom.

A driving gear 30 is fixed to a lower end portion of the rotation shaft 25 of the motor 24. A driven gear 31 is fixed to a lower end portion of the input shaft 28 of the intermittent drive unit 27. The driving gear 30 is meshed with the driven gear 31. The driving gear 30 and the driven gear 31 have equal outside diameters and equal numbers of teeth. Therefore, during operation of the motor 24, the input shaft 28 of the intermittent drive unit 27 rotates at the same speed as the rotation shaft 25 of the motor 24.

Figure 3:
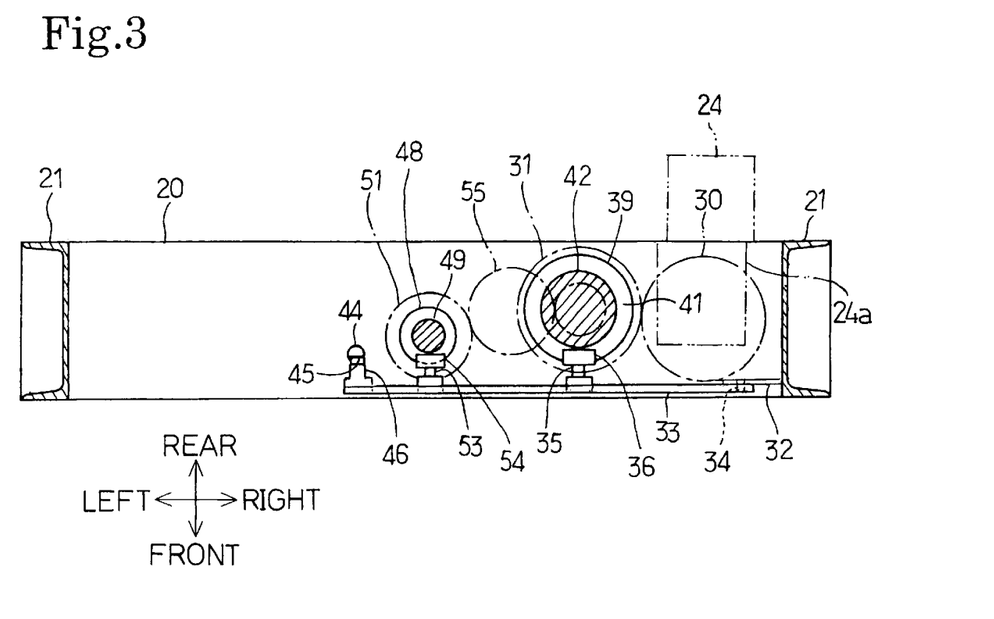
FIG. 3 is a sectional view taken along plane X3—X3 of FIG. 1.

A lever bracket 32 is fixed to the right-side support column 21. A lever 33 is connected at its right side end portion to the lever bracket 32 so that the lever 33 is pivotable about a shaft 34. As shown in FIG. 3, a shaft 35 is fixed to a portion of the lever 33 that is substantially central with respect to the length of the lever 33. The shaft 35 protrudes rearward from the lever 33. A circular cam follower 36 is rotatably connected to a rear end portion of the shaft 35.

Figure 4:
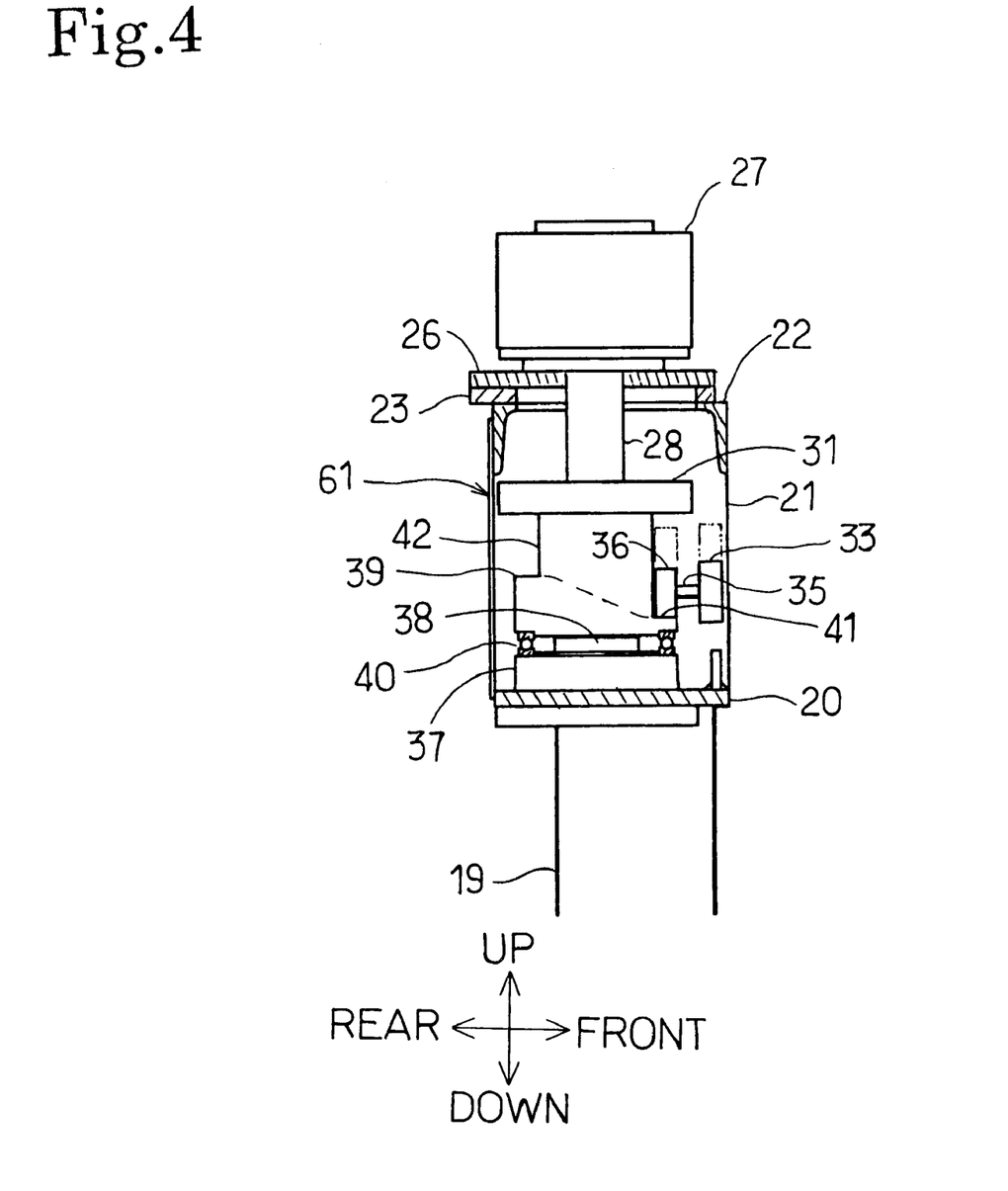
FIG. 4 is a sectional view taken along plane X4—X4 of FIG. 1.

A cam bracket 37 is disposed below the intermittent drive unit 27, and is fixed to the intermediate plate 20 as shown in FIG. 1. A cam 39 is rotatably connected to the cam bracket 37 by a shaft 38 as shown in FIG. 4. A thrust bearing 40 is disposed between the cam 39 and the cam bracket 37. The cam 39 has a cam surface 41 that is formed in an upper outer peripheral portion of the cam 39. The cam follower 36 of the lever 33 is held on the cam surface 41 by the weight of the lever 33 and the like.

A cylindrical connecting portion 42 is formed in a central portion of the cam 39. The connecting portion 42 is connected at its upper surface to the driven gear 31 of the intermittent drive unit 27. During operation of the motor 24, the cam 39 rotates together with the input shaft 28 of the intermittent drive unit 27. As the cam 39 rotates, the cam follower 36 of the lever 33 moves along the cam surface 41 of the cam 39, thereby pivoting the lever 33 about the shaft 34.

Figure 5A:
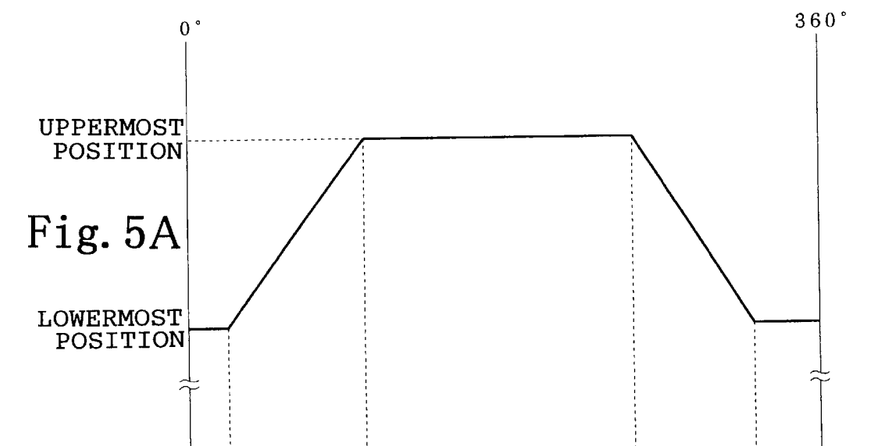

FIG. 5(a) is a chart indicating the relationship between the rotation phase angle of the motor 24 and the behavior of the lever 33. As indicated in FIG. 5(a), the lever 33 is held at a lowermost position at which the lever 33 is in a rightwardly upward sloped posture (see FIG. 1) in the range of rotation phase angle of 0–θ1°. In the range of rotation phase angle of θ1°–θ2°, a left side portion of the lever 33 turns in a direction indicated by an arrow A in FIG. 1. In the range of rotation phase angle of θ2°–θ3°, the lever 33 is held at an uppermost position at which the lever 33 is in a leftwardly upward sloped posture (see FIG. 2). In the range of rotation phase angle of θ3°–θ4°, the left side portion of the lever 33 turns in the direction opposite to the direction of an arrow in FIG. 2. In the range of rotation phase angle of θ4°–360°, the lever 33 is held at the lowermost position as in FIG. 1.

As shown in FIG. 1, sleeves 43 are fixed to the top plate 22 and the intermediate plate 20, respectively, at a position that is shifted sideways to the left from a central portion of the plate in the right-to-left direction. A cylindrical slide rod 44 is inserted through the sleeves 43 for upward and downward movements. As shown in FIG. 3, the slide rod 44 has an engaging portion 45 that has a cutout shape and that opens forward.

A pin 46 is fixed to a left end portion of the lever 33. The pin 46 is engaged with the engaging portion 45 of the slide rod 44 in a manner that allows the pin 46 to shift in position. Therefore, during operation of the motor 24, the slide rod 44 is moved upward by the lever 33 pivoting in the direction of the arrow A in FIG. 1, and then is moved downward by the lever 33 pivoting in the direction opposite to the direction of the arrow in FIG. 2.

As shown in FIG. 1, a slide cover 47 is disposed between the support columns 19 slidably upward and downward. The slide cover 47 is connected to a lower end portion of the slide rod 44 in a manner that prevents rotational movements. During operation of the motor 24, the slide cover 47 is moved upward by the lever 33 pivoting in the direction of the arrow A in FIG. 1, and then is moved downward by the lever 33 pivoting in the direction opposite to the direction of the arrow in FIG. 2.

As shown in FIG. 1, a sleeve 48 is fixed to the intermediate plate 20, at the right side of the slide rod 44. A turning rod 49 is inserted through the sleeve 48 in such a manner that the turning rod 49 is movable upward and downward and rotatable. The turning rod 49 has a large-diameter portion 50 in an upper end portion of the turning rod 49. A turning gear 51 is fixed to an upper end portion of the large-diameter portion 50. A core shaft 52 is fixed to the mounting plate 26, at the left side of the intermittent drive unit 27. The turning gear 51 is fitted over an outer peripheral surface of the core shaft 52 so that the turning gear 51 is movable upward and downward and rotatable.

As shown in FIG. 3, a shaft 53 is fixed to the lever 33, at the right side of the pin 46. The shaft 53 protrudes rearward from the lever 33. A roller 54 is rotatably connected to a rear end portion of the shaft 53. The roller 54 supports the large-diameter portion 50 of the turning rod 49 from below. During operation of the motor 24, the turning rod 49 and the turning gear 51 are moved upward by the lever 33 pivoting in the direction of the arrow A in FIG. 1, and then are moved downward by the lever 33 pivoting in the direction opposite to the direction of the arrow in FIG. 2.

Figure 5B:
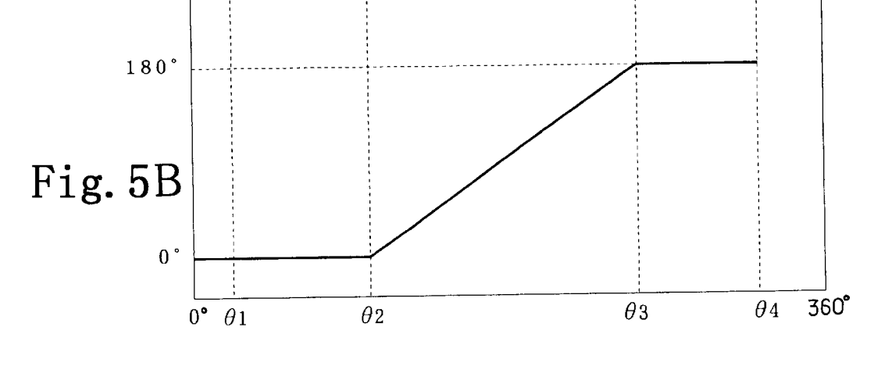

The intermittent drive unit 27 is of a parallel cam type having two plate cams (not shown) and two rows of plural driven rollers (not shown). The input shaft 28 of the intermittent drive unit 27 is connected to the two plate cams, and the output shaft 29 is connected to the two rows of driven rollers. The two plate cams are rotatable together with the input shaft 28. The two rows of driven rollers are sequentially conveyed by the two plate cams. As the two rows of driven rollers are conveyed, the output shaft 29 is rotated. FIG. 5(b) is a graph indicating the relationship between the rotation phase angle of the motor 24 and the behavior of the output shaft 29. The output shaft 29 is turned 180° only in the range of rotation phase angle of θ2°–θ3°, where the lever 33 is held at the uppermost position.

As shown in FIG. 1, an output gear 55 is fixed to the output shaft 29 of the intermittent drive unit 27. The output gear 55 is meshed with the turning gear 51. The turning gear 51 and the output gear 55 have equal diameters and equal numbers of teeth. Therefore, in the range of rotation phase angle of θ2°–θ3°, where the slide cover 47 is held at the uppermost position, the turning gear 51 and the turning rod 49 are turned 180° in concert with the output shaft 29.

In the range of rotation phase angle of θ1°–θ2°, where the slide cover 47 is moved upward from the lowermost position to the uppermost position, the output shaft 29 is held in a still state, but the turning gear 51 and the turning rod 49 are moved upward in concert with the lever 33. In the range of rotation phase angle of θ3°–θ4°, where the slide cover 47 is moved downward from the uppermost position to the lowermost position, the output shaft 29 is held in the still state, but the turning gear 51 and the turning rod 49 are moved downward in concert with the lever 33.

As shown in FIG. 1, two brackets 56 are fixed to a lower end portion of the turning rod 49. The brackets 56 are spaced apart from each other by 180° in a circumferential direction. Platy turning covers 57 are connected to the brackets 56, respectively. In the ranges of rotation phase angle of 0°–θ1° and θ4°–θ360°, where the slide cover 47 is held at the lowermost position, the turning covers 57, corresponding to a partition cover, are pivoted to a closed state in which the turning covers 57 cover the machining center 4 from a forward side, and upper end portions of the turning covers 57 overlap a lower end portion of the slide cover 47 in the front-to-rear direction.

Figure 2:
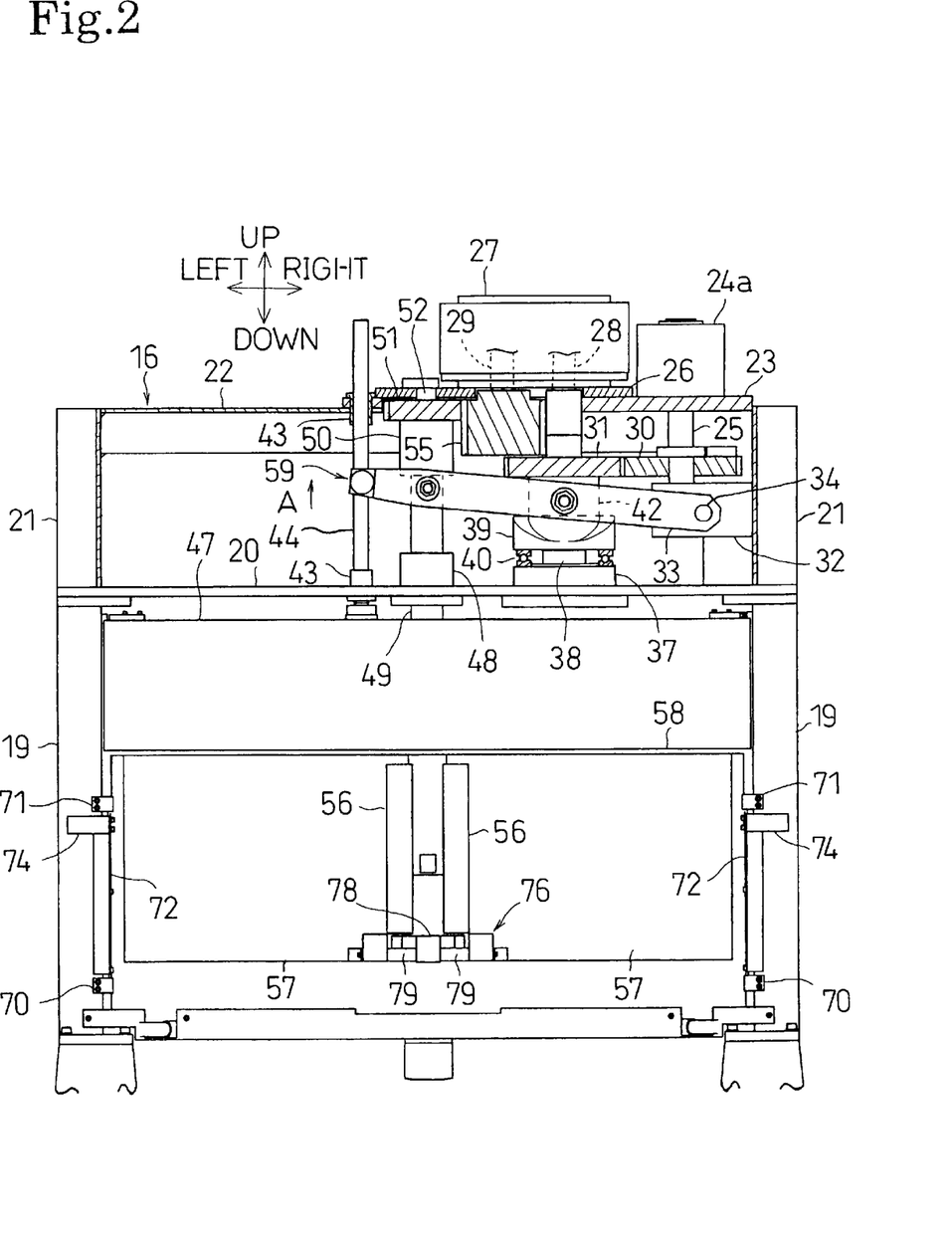
FIG. 2 is a front view of the protection cover apparatus and the pallet changer apparatus, with the pallet changing arm and the like being at an elevated position.

In the range of rotation phase angle of θ1°–θ2°, where the slide cover 47 is moved upward from the lowermost position to the uppermost position, the large-diameter portion 50 of the turning rod 49 is pushed upward by the roller 54 of the lever 33 and, therefore, the turning covers 57 are elevated together with the turning rod 49 while the closed state of the turning covers 57 is maintained. Since the slide rod 44 is connected to a distal end portion of the lever 33, whereas the turning rod 49 is connected to a relatively base end side of the lever 33, the amount of elevation of the slide cover 47 becomes greater than that of the turning covers 57, so that a clearance 58 is formed between the lower end of the slide cover 47 and the upper ends of the turning covers 57 as can be seen in FIG. 2.

In the range of rotation phase angle of θ2°–θ3°, where the slide cover 47 is held at the uppermost position, the turning covers 57 are pivoted 180° by the output shaft 29 of the intermittent drive unit 27 while the turning covers 57 are held at the uppermost position. Since the clearance 58 exists between the lower end of the slide cover 47 and the upper ends of the turning covers 57, the slide cover 47 does not interfere with the pivoting movements of the turning covers 57.

In the range of rotation phase angle of θ3°–θ4°, where the slide cover 47 is moved downward from the uppermost position to the lowermost position, the roller 54 of the lever 33 moves downward. Therefore, a point at which the roller 54 supports the turning rod 49 gradually descends, so that the turning covers 57 return to the lowermost position together with the turning rod 49, while the closed state of the turning covers 57 is maintained as shown in FIG. 1.

In FIG. 1, reference numeral 59 represents a raising/lowering mechanism that is mainly formed by the lever 33, the slide rod 44, the pin 46 of the lever 33, the turning rod 49, and the roller 54 of the lever 33. As is apparent from the above description, the raising/lowering mechanism 59 moves the slide cover 47 and the turning covers 57 upward and downward. Reference numeral 60 in FIG. 1 represents a turning mechanism that is mainly formed by the turning rod 49, the turning gear 51, and the output gear 55. The turning mechanism 60 pivots the turning covers 57, as is apparent from the above description.

Reference numeral 61 in FIG. 4 represents a second cam drive portion that is mainly formed by the driving gear 30, the driven gear 31, the cam follower 36 of the lever 33, and the cam 39. The second cam portion 61 transmits drive force from the motor 24 to the raising/lowering mechanism 59 so as to hold the slide cover 47 and the turning covers 57 at the uppermost position, as is apparent from the above description. Reference numeral 62 in FIG. 1 represents a drive force transmitting mechanism that is mainly formed by the intermittent drive unit 27, corresponding to the first cam drive portion, and the second cam portion 61. The drive force transmitting mechanism 62 transmits drive force from the motor 24 to the raising/lowering mechanism 59 and the turning mechanism 60 at set timings, as is apparent from the above description.

As shown in FIGS. 6(a) and 6(b), each support column 19 is provided with a vertically elongated lever 63 that is connected thereto rotatably about a shaft 64. Each lever 63 has a centrally receded cam surface 65. Each support column 19 has a vertically elongated hole r forward of the lever 63.

Cams 67 are fixed to both sides of the slide cover 47. Each cam 67 is slidably inserted in the elongated hole 66 of the corresponding support column 19. While the slide cover 47 is held at the lowermost position, each cam 67 is held in contact with a lower portion of the cam surface 65 of the corresponding lever 63 in such a manner that the lever 63 is held at a position where a lower end portion of the lever 63 is turned in a direction of an arrow B as indicated by a solid line in FIG. 6(b). When the slide cover 47 is moved to the uppermost position, each cam 67 is moved to an upper portion of the corresponding cam surface 65 so that a lower end portion of the lever 63 is turned in the direction opposite to the direction of the arrow B as indicated by the double dashed chain line in FIG. 6(b).

Each support column 19 is provided with a bracket 68 that is fixed thereto so as to face a lower end portion of the lever 63. Each bracket 68 is provided with a push rod 69 that is connected thereto slidably forward and rearward. Each push rod 69 is held at a withdrawn position as indicated by a solid line in FIG. 6(b) when the slide cover 47 is held at the lowermost position. When the slide cover 47 is moved to the uppermost position, each push rod 69 is pushed forward by the lower end portion of the corresponding lever 63 as indicated by a double dashed chain line in FIG. 6(b).

As shown in FIG. 1, each support column 19 is provided with a bracket 70 and a bracket 71 that are fixed to a lower end portion of the support column 19 and to a central portion with respect to the height of the support column 19, respectively. As shown in FIGS. 7(a) and 7(b), a shaft 73 of a sub-cover 72 is rotatably connected to each pair of brackets 70, 71. Each sub-cover 72 has an L-shaped sectional shape, having vertically elongated front and side platy portions. Each sub-cover 72 is provided with a push plate 74 that is fixed to an upper end portion of the front platy portion of the sub-cover 72 as shown in FIG. 1. Each support column 19 is provided with a pin 75 that faces the corresponding push plate 74 as shown in FIGS. 7(a) and 7(b).

A cover spring (not shown) is disposed between each sub-cover 72 and the corresponding support column 19. Each cover spring urges the corresponding sub-cover 72 in a direction indicated by an arrow C in FIGS. 7(a) and 7(b). When the slide cover 47 and the turning covers 57 are held at the lowermost position, each sub-cover 72 are held in contact with the pin 75 and the push rod 69 by force from the cover spring as indicted by a solid line in FIG. 7(b). In this state, each sub-cover 72 overlaps the corresponding turning cover 57 in the front-to-rear direction, thus covering the turning covers 57 and the support columns 19 from the front side.

When the slide cover 47 and the turning covers 57 are moved from the lowermost position to the uppermost position, each push rods 69 is pushed forward by the corresponding lever 63 as indicated by the double dashed chain line in FIG. 6(b), so that each push rod 69 pushes the corresponding push plate 74 forward. Therefore, each sub-cover 72 is pivoted in the direction opposite to the direction of the arrow C as indicated by the double dashed chain line in FIG. 7(b). In this state, each sub-cover 72 is withdrawn toward a side end of the corresponding turning cover 57, thus preventing the turning covers 57 from interfering with the sub-covers 72 when the turning covers 57 are turned.

As the slide cover 47 and the turning covers 57 are moved from the uppermost position to the lowermost position, the cams 67 of the slide cover 47 descend. Since each sub-cover 72 is urged by the cover spring, each sub-cover 72 pushes the corresponding push rod 69 backward, so that each push rod 69 pushes the lower end portion of the corresponding lever 63 rearward. Thus, the levers 63 are pivoted in the direction of the arrow B. Each sub-cover 72 pivots in the direction of the arrow C as the slide cover 47 and the turning covers 57 descend. When the slide cover 47 and the turning covers 57 reach the lowermost position, the sub-covers 72 return to the state indicated by the solid line in FIG. 7(b). The protection cover apparatus 16 is constructed in this manner.

Figure 8:
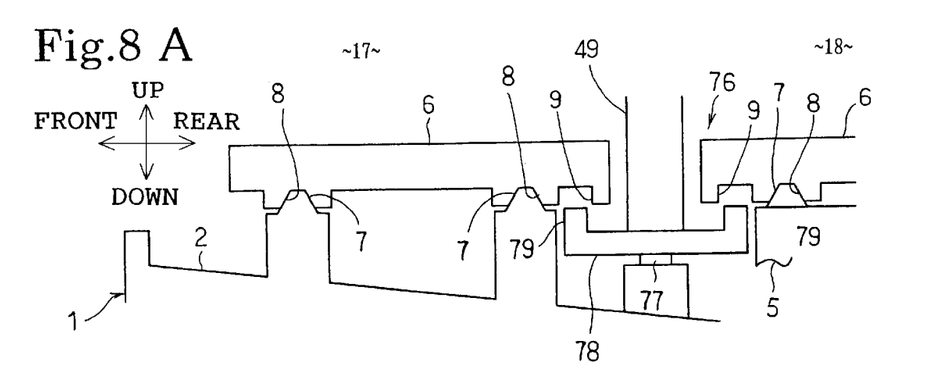

As shown in FIGS. 8(a) and 8(b), the table 1 is provided with a pallet changer apparatus 76. The pallet changer apparatus 76 shares the motor 24, the raising/lowering mechanism 59, the turning mechanism 60, the intermittent drive unit 27, the second cam portion 61, and the drive force transmitting mechanism 62, with the protection cover apparatus 16. The pallet changer apparatus 76 is constructed as described below.

PALLET CHANGER APPARATUS 76

A shaft 77 is fixed to the higher table portion 2 of the table 1. A pallet changing arm 78 is connected to the shaft 77 in such a manner that the pallet changing arm 78 is movable upward and downward and rotatable. Each of opposite end portions of the pallet changing arm 78 is provided with two upwardly protruded pallet holding portions 79 as shown in FIG. 7(a). The pallet changing arm 78 is connected to a lower end portion of the turning rod 49. When the turning covers 57 are in the closed state, the pallet changing arm 78 is directed in the front-to-rear direction.

As shown in FIG. 8(a), the positioning protrusions 7 are provided on the higher table portion 2 of the table 1. The positioning protrusions 7 of the higher table portion 2 are engaged with the positioning recesses 8 of a pallet 6. The pallet 6 on the higher table portion 2 carries thereon a workpiece (not shown). The pallet 6 on the higher table portion 2 is set at the setup position to perform setups by the positioning recesses 8 of the pallet 6 engaging with the positioning protrusions 7 of the higher table portion 2. The pallet changer apparatus 76 is constructed in this manner.

The operation performed by the above-described construction will be described. In the range of rotation phase angle of the motor 24 of 0°–01°, the slide cover 47 is held at its lowermost position, and the turning covers 57 are held at their lowermost position in the closed state. Furthermore, the sub-covers 72 overlap the turning covers 57 in the forward direction, thereby covering gaps between the turning covers 57 and the corresponding support columns 19 from the front side. In this state, the two pallet holding portions 79 on the rearward end portion of the pallet changing arm 78 are positioned below the engaging recesses 9 of the pallet 6 positioned at the processing position, and the two pallet holding portions 79 at the forward end portion of the pallet changing arm 78 are positioned below the engaging recesses 9 of the pallet 6 positioned at the setup position, as shown in FIG. 8(a).

In the range of rotation phase angle of the motor 24 of θ1°–θ2°, the slide cover 47 is raised from the lowermost position to the uppermost position, and the turning covers 57 are raised from the lowermost position to the uppermost position while remaining in the closed state. At the same time, each sub-cover 72 is pivoted in the direction opposite to the direction of the arrow C in FIG. 7(b) to withdraw out of the turning locus of the corresponding turning cover 57. At this moment, the pallet changing arm 78 is raised together with the turning covers 57, so that the rearward pallet holding portions 79 of the pallet changing arm 78 engage with the engaging recesses 9 of the pallet 6 positioned at the processing position, and the forward pallet holding portions 79 of the pallet changing arm 78 engage with the engaging recesses 9 of the pallet 6 positioned at the setup position. Then, the two pallets 6 are lifted by the pallet changing arm 78, so that the positioning recesses 8 of the pallets 6 disengage from the positioning protrusions 7 of the table 1.

In the range of rotation phase angle of the motor 24 of θ2°–θ3°, the turning covers 57 are turned 180° while being held at the uppermost position, and the pallet changing arm 78 is turned 180° together with the turning covers 57. Due to this movement, the pallet 6 positioned at the processing position is conveyed therefrom into the setup space 17, and the pallet 6 positioned at the setup position is conveyed therefrom into the processing space 18. The pallet 6 conveyed from the processing position is positioned so that the positioning recesses 8 of the pallet 6 face, from above, the positioning protrusions 7 in the setup space 17. The pallet 6 conveyed from the setup position is positioned so that the positioning recesses 8 of the pallet 6 face, from above, the positioning protrusions 7 in the processing space 18.

In the range of rotation phase angle of the motor 24 of θ3°–θ4°, the slide cover 47 is moved down from the uppermost position to the lowermost position, and the turning covers 57 are moved down from the uppermost position to the lowermost position while being held in the closed state. Due to this movement, each sub-cover 72 is pivoted in the direction indicated by the arrow C in FIG. 7(b) to return to the overlap position forward of the corresponding turning cover 57. Simultaneously, the pallet changing arm 78 is moved down together with the turning covers 57, so that the positioning recesses 8 of the pallet 6 in the setup space 17 engage with the positioning protrusions 7 of the table 1 in the setup space 17 and so that the positioning recesses 8 of the pallet 6 in the processing space 18 engage with the positioning protrusions 7 of the table 1 in the processing space 18. Thus, the pallet 6 at the processing position and the pallet 6 at the setup position are automatically interchanged in position.

As described above, this embodiment raises and lowers and turns the pallet changing arm 78 by using the single motor 24 provided above the table 1. Therefore, the size of the table 1 can be reduced so that an operator can easily perform required operations without being impeded by the table 1. Furthermore, the embodiment eliminates the need to determine the drive times of a plurality of drive force sources based on the output signals from sensors. Therefore, the embodiment reduces the possibility of a malfunction and improves reliability.

Furthermore, the drive time of the raising/lowering mechanism 59 and the drive time of the turning mechanism 60 are set by the intermittent drive unit 27 and the second cam portion 61. Therefore, the pallet changing arm 78 is turned and moved up and down reliably at the set timings without malfunctioning. The reliability is thus further enhanced.

Still further, the provision of the turning covers 57 between the setup position and the processing position prevents an undesired event, such as, for example, during the processing of a workpiece, processing debris and the like traveling from the processing position to the setup position. Furthermore, the connection of the turning covers 57 to the raising/lowering mechanism 59 and the turning mechanism 60 eliminates the need for dedicated drive force sources for turning and raising and lowering the turning covers 57, thus simplifying the structure of the apparatus.

Although in the foregoing embodiment, the slide cover 47 is provided between the setup position and the processing position, this arrangement is not restrictive. For example, the slide cover 47 may be omitted.

Furthermore, although in the foregoing embodiment, the sub-covers 72 are provided between the turning covers 57 and the corresponding support columns 19, this arrangement is not restrictive. For example, the sub-covers 72 may be omitted.

As is apparent from the foregoing description, the pallet changer apparatus of the invention achieves advantages as follows.

Since the pallet changing arm is moved up and down and turned by using a single drive force source provided above the table, the apparatus of the invention allows an operator to easily perform required operations, and improves reliability.

With a structure in which the drive time of the turning mechanism and the drive time of the raising/lowering mechanism are set by a first cam drive portion and a second cam drive portion, the pallet changer apparatus further improves reliability.

With a structure in which a partition cover is provided between the setup position and the processing position, the pallet changer apparatus prevents an undesired event, such as, for example, during the processing of a workpiece, processing debris and the like travel from the processing position to the setup position. Furthermore, connecting the partition cover to the turning mechanism and the raising/lowering mechanism eliminates the need for dedicated drive force sources to turn and raise and lower the partition cover, thereby simplifying the structure of the apparatus.

It is to be understood that the invention is not restricted to the particular forms shown in the foregoing embodiment. Various modifications and alternations can be made thereto without departing from the scope of the invention.

What is claimed is:

1. A pallet changer apparatus for changing pallets between a setup position on a table at which a setup for a processing is performed, and a processing position on the table at which a workpiece is processed, comprising:

a pallet changing arm that holds the pallets;

a turning mechanism that turns the pallet changing arm between the setup position and the processing position;

a raising/lowering mechanism that removes the pallets from the setup position and the processing position by raising the pallet changing arm, and that places the pallets at the setup position and the processing position by lowering the pallet changing arm after the turning mechanism turns the pallet changing arm; and a drive force source that generates a drive force for the raising/lowering mechanism and the turning mechanism.

2. The pallet changer apparatus according to claim 1, further comprising:

a first cam drive portion that transmits the drive force from the drive force source to the turning mechanism at a set timing; and a second cam drive portion that transmits the drive force from the drive force source to the raising/lowering mechanism at a set timing.

3. The pallet changer apparatus according to claim 2, further comprising a partition cover provided between the setup position and the processing position, the partition cover being connected to the turning mechanism and the raising/lowering mechanism.

4. The pallet changer apparatus according to claim 1, further comprising a partition cover provided between the setup position and the processing position, the partition cover being connected to the turning mechanism and the raising/lowering mechanism.

5. The pallet changer apparatus according to claim 1, wherein the pallet changing arm has a generally c-shaped cross-section.

6. The pallet changer apparatus according to claim 5, wherein the pallet changing arm includes a horizontally extending member and a pair of vertically extending members, each of the vertically extending members being disposed at an end of the horizontally extending member.

7. The pallet changer apparatus according to claim 6, wherein that turning mechanism includes a turning arm that contacts an upper surface of a longitudinal midpoint of the horizontally extending member between the pair of vertically extending members.

8. The pallet changer apparatus according to claim 7, wherein the raising/lowering mechanism includes a shaft that contacts a lower surface of the longitudinal midpoint of the horizontally extending member.

9. The pallet changer apparatus according to claim 8, wherein each pallet defines an engaging recess adjacent an end of the pallet, one of the pair of vertically extending members communicates with the engaging recess of a pallet in the setup space, and the other of the pair of the vertically extending members simultaneously communicates with the engaging recess of a pallet in the processing space.

10. The pallet changer apparatus according to claim 9, wherein each of the vertically extending members has a rectangular cross-section, and each of the engaging recesses defines a corresponding rectangular recess.

11. The pallet changer apparatus according to claim 1, wherein, the drive force source is provided above the table.

12. A method of changing pallets between a setup position on a table at which a setup for a processing is performed, and a processing position on the table at which a workpiece is processed, the method comprising the steps of:

holding the pallets with a pallet changing arm;

turning the pallet changing arm, with a turning mechanism, between the setup position and the processing position;

removing the pallets from the setup position and the processing position, with a raising/lowering mechanism, by raising the pallet changing arm;

placing the pallets at the setup position and the processing position by lowering the pallet changing arm after the turning mechanism turns the pallet changing arm; and providing a drive force for the raising/lowering mechanism and the turning mechanism with a drive force source.

13. The method according to claim 12, wherein the providing step includes transmitting the drive force from the drive force source to the turning mechanism with a first cam drive portion at a set timing; and transmitting the drive force from the drive force source to the raising/lowering mechanism with a second cam drive portion at a set timing.

14. The method according to claim 13, further comprising the step of connecting a partition cover, that is provided between the setup position and the processing position, to the turning mechanism and the raising/lowering mechanism.

15. The method according to claim 12, further comprising the step of connecting a partition cover, that is provided between the setup position and the processing position, to the turning mechanism and the raising/lowering mechanism.

16. The method according to claim 12, wherein the holding setup includes holding the pallets with a pallet changing arm that has a generally c-shaped cross-section.

17. The method according to claim 16, wherein the holding step includes holding the pallets with a pallet changing arm that includes a horizontally extending member and a pair of vertically extending members, each of the vertically extending members being disposed at an end of the horizontally extending member.

18. The method according to claim 17, wherein the turning step includes turning the pallet changing arm with a turning arm that contacts an upper surface of a longitudinal midpoint of the horizontally extending member between the pair of vertically extending members.

19. The method according to claim 18, wherein the removing and placing steps include contacting a lower surface of the longitudinal midpoint of the horizontally extending member with a shaft.

20. The method according to claim 19, further including the steps of communicating one of the pair of vertically extending members with an engaging recess defined adjacent an end of a pallet in the setup space, and communicating the other of the pair of vertically extending members with an engaging recess defined adjacent an end of a pallet in the processing space.

21. The method according to claim 20, wherein the communicating steps include communicating vertically extending members that each have a rectangular cross-section with engaging recesses that each define a corresponding rectangular recess.

22. The method according to claim 12, wherein the providing step includes providing the drive force source above the table.

* * * * *